(12) United States Patent
Chae et al.

(10) Patent No.: US 9,048,907 B2
(45) Date of Patent: Jun. 2, 2015

(54) METHODS FOR REDUCING INTERFERENCE IN COMMUNICATION SYSTEMS

(75) Inventors: Chan-Byoung Chae, Summit, NJ (US); Doru Calin, Manalapan, NJ (US); Kai Yang, Princeton, NJ (US); Simon Yiu, Jersey City, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 386 days.

(21) Appl. No.: 12/659,471

(22) Filed: Mar. 10, 2010

(65) Prior Publication Data

US 2011/0223867 A1 Sep. 15, 2011

(51) Int. Cl.
| H04W 4/00 | (2009.01) |
| H04B 7/06 | (2006.01) |
| H04B 7/04 | (2006.01) |
| H04B 7/08 | (2006.01) |
| H04B 7/02 | (2006.01) |

(52) U.S. Cl.
CPC .............. *H04B 7/0626* (2013.01); *H04B 7/024* (2013.01); *H04B 7/0404* (2013.01); *H04B 7/0408* (2013.01); *H04B 7/0452* (2013.01); *H04B 7/0617* (2013.01); *H04B 7/0695* (2013.01); *H04B 7/086* (2013.01); *H04B 17/345* (2015.01)

(58) Field of Classification Search
CPC .... H04B 17/005; H04B 7/024; H04B 7/0404; H04B 7/0408; H04B 7/0452; H04B 7/0617; H04B 7/0626; H04B 7/0695; H04B 7/086

USPC ............................. 455/63.1, 67.13, 427, 422.1
See application file for complete search history.

(56) References Cited

U.S. PATENT DOCUMENTS

| 6,400,780 B1 | 6/2002 | Rashid-Farrokhi et al. |
| 7,274,677 B1* | 9/2007 | Lewis ........................... 370/330 |
| 8,130,855 B2 | 3/2012 | Kwak et al. |
| 2002/0115474 A1* | 8/2002 | Yoshino et al. ............... 455/562 |
| 2003/0157897 A1* | 8/2003 | Maeda et al. ................. 455/67.3 |
| 2005/0271016 A1 | 12/2005 | Kim et al. |
| 2006/0133530 A1 | 6/2006 | Kwak et al. |
| 2006/0203891 A1 | 9/2006 | Sampath et al. |

(Continued)

FOREIGN PATENT DOCUMENTS

| CN | 1253425 | 5/2000 |
| CN | 101026397 | 8/2007 |

(Continued)

OTHER PUBLICATIONS

Invitation to Pay and International Search Report dated Jun. 14, 2011.

(Continued)

*Primary Examiner* — Golam Sorowar
(74) *Attorney, Agent, or Firm* — Harness, Dickey & Pierce, P.L.C.

(57) ABSTRACT

Example embodiments are directed to methods of reducing interference in a communication system. A method includes receiving, by a transmitter, first and second quantized matrices from a mobile station. The first and second quantized matrices are based on an estimated channel matrix and an estimated interference matrix. The method further includes determining, by the transmitter, a transmission beamforming vector based on the first and second quantized values.

2 Claims, 9 Drawing Sheets

(56) References Cited

U.S. PATENT DOCUMENTS

| | | | |
|---|---|---|---|
| 2007/0135051 A1* | 6/2007 | Zheng et al. | 455/63.1 |
| 2007/0142045 A1* | 6/2007 | Senarath et al. | 455/422.1 |
| 2007/0201566 A1 | 8/2007 | Solomon et al. | |
| 2008/0267063 A1 | 10/2008 | Trigui et al. | |
| 2012/0140845 A1 | 6/2012 | Kwak et al. | |

FOREIGN PATENT DOCUMENTS

| | | |
|---|---|---|
| CN | 101159462 A | 4/2008 |
| CN | 101421951 | 4/2009 |
| JP | 2001251233 A | 9/2001 |
| JP | 2002208812 A | 7/2002 |
| JP | 2008520167 A | 6/2008 |
| JP | 2008544590 A | 12/2008 |
| WO | WO 2006/099349 | 9/2006 |
| WO | WO 2006/107230 | 10/2006 |
| WO | WO 2008/157646 | 12/2008 |
| WO | WO-2010017334 A1 | 2/2010 |
| WO | WO-2010017482 A1 | 2/2010 |
| WO | WO 2011/094207 | 8/2011 |

OTHER PUBLICATIONS

Chan-Byoung Chae et al. "A Low Complexity Linear Multiuser MIMO Beamforming System with Limited Feedback", Information Sciences and Systems, 2008. CISS 2008. $42^{nd}$ Annual Conference on, IEEE, Piscataway, NJ, USA, Mar. 19, 2008, pp. 418-422, XP031282907, ISBN: 978-1-4244-2246-3.

International Search Report and Written Opinion dated Aug. 25, 2011.

Chan-Byoung Chae et al., "Network Coordinated Beamforming for Cell-Boundary Users: Linear and Nonlinear Approaches" IEEE Journal of Selected Topics in Signal Processing, vol. 3, No. 6, Dec. 2009, pp. 1094-1105.

Chinese Office Action dated Jun. 5, 2014.

Office Action for corresponding Chinese Application No. 201180013114.4 dated Feb. 2, 2015.

* cited by examiner

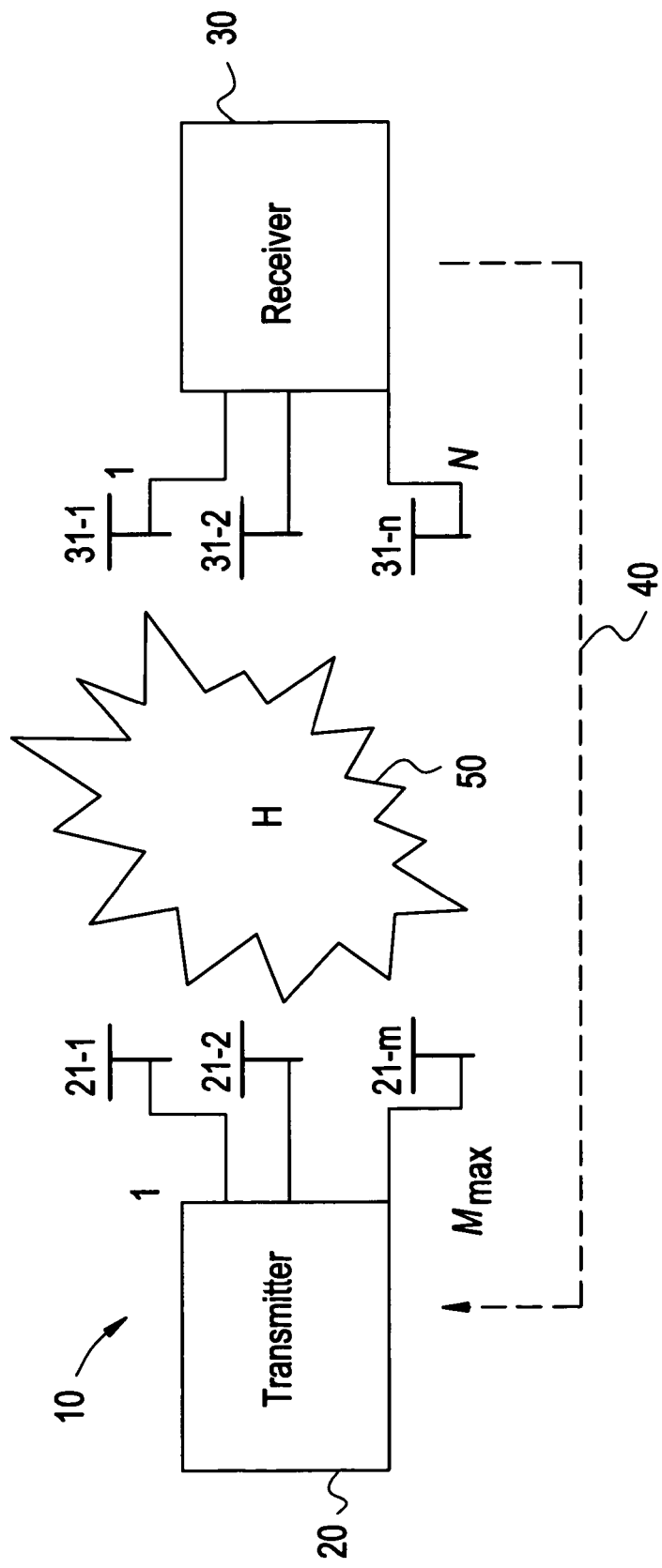

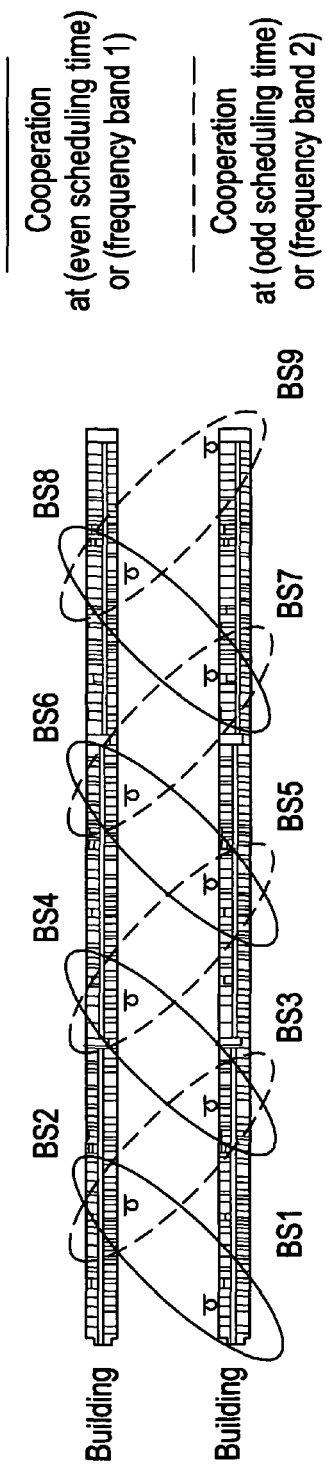
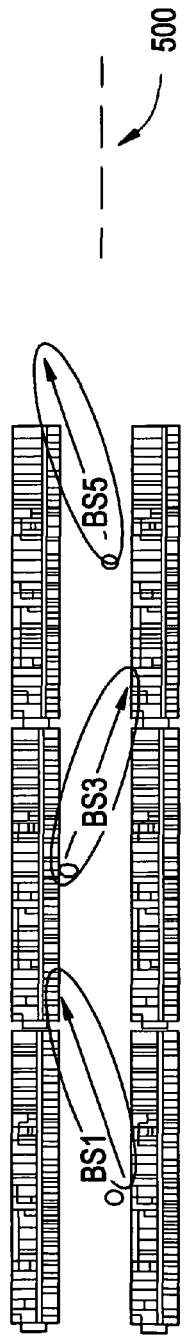
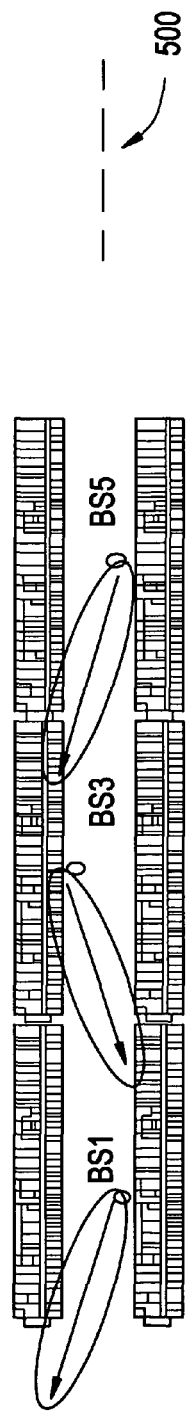
FIG. 4
FIG. 5A
Conventional Art
FIG. 5B
Conventional Art

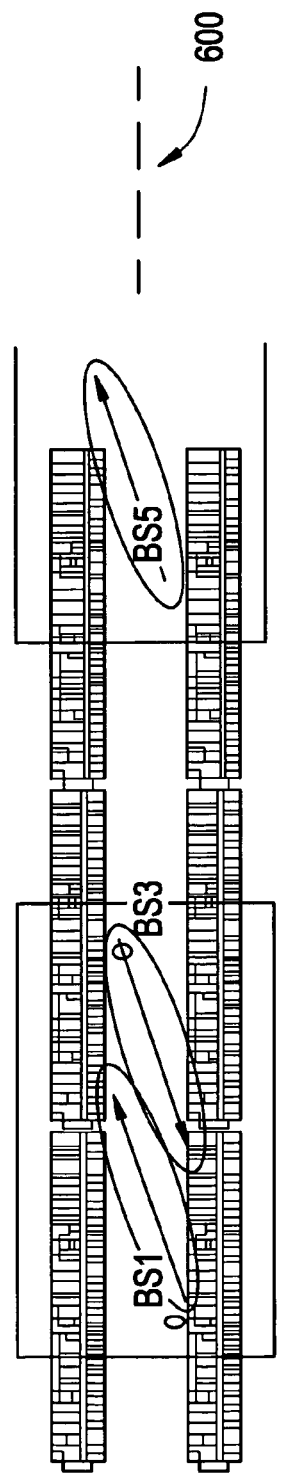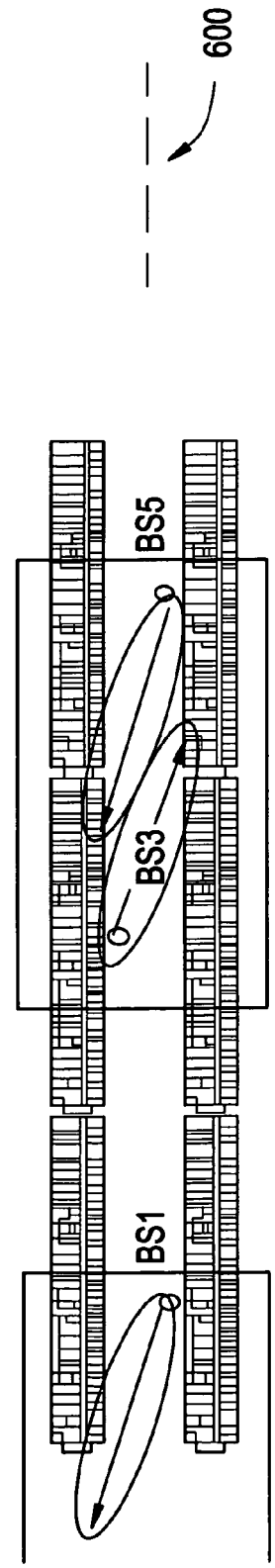

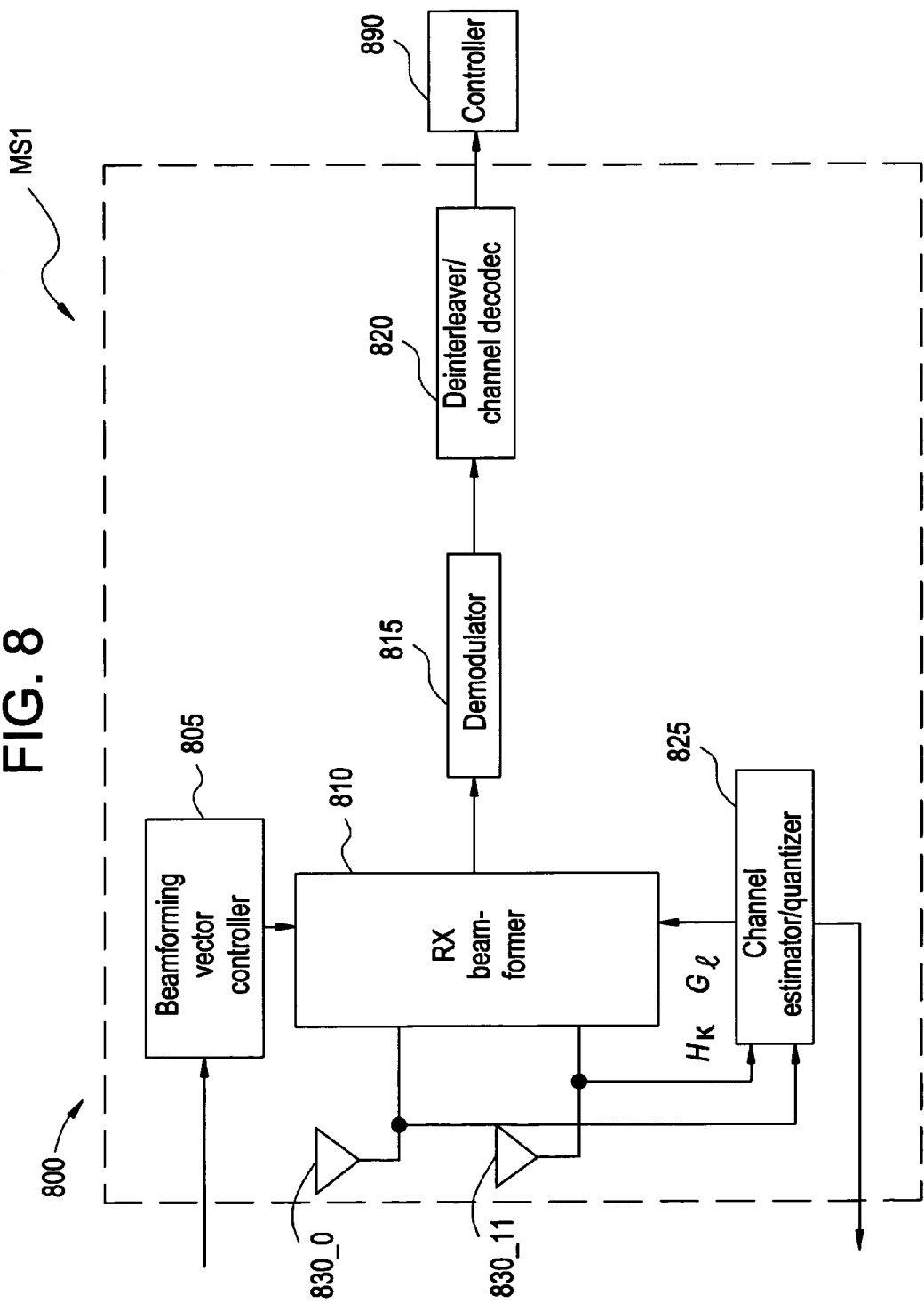

METHODS FOR REDUCING INTERFERENCE IN COMMUNICATION SYSTEMS

BACKGROUND

Multiple-input-multiple-output (MIMO) systems represent an advance in wireless communication. MIMO employs multiple antennas at the transmitting and receiving ends of a wireless link to improve the data transmission rate while holding radio bandwidth and power constant.

A MIMO transmitter transmits an outgoing signal using multiple antennas by demultiplexing the outgoing signal into multiple sub-signals and transmitting the sub-signals from separate antennas. MIMO exploits multiple signal propagation paths to increase throughput and reduce bit error rates. Each sub-signal reflects off the local environment along its associated signal propagation paths. The spatial richness of the local environment is a function of the uniqueness and distinctness among the different associated signal propagation paths. While multiple signal propagation paths cause interference and fading in conventional radios, MIMO uses these multiple signal propagation paths to carry more information than conventional radio transmissions.

FIG. 1 illustrates a basic MIMO wireless link 10, where the transmitter 20 has $M_{max}$ transmitting antennas 21 (21-1 ... 21-m), and the receiving station 30 has N receiving antenna 31 (31-1 ... 31-n), the number of transmitters active at a given moment is M, such that $M<=M_{max}$. A scattering environment 50 with some degree of spatial richness, or statistical independence of fading coefficients, exists between the transmitter and receiver. The channel matrix H represents the channel connection characteristics (or impulse response) between the transmitting and receiving antennas, 21 and 31, respectively.

Most improvements on multiuser MIMO systems have been directed to single cell environments in which one base station serves several users. However, in multiple cell environments, capacity gain is degraded.

Moreover, most prior network MIMO algorithms that were designed to support multiple users and improve capacity gain assumed that all base stations in a multi-cell environment have to share all the data messages to be transmitted to each user. This assumption is difficult to implement.

SUMMARY

Example embodiments are directed to methods for reducing interference between users in a system having base stations and mobile stations that include multiple antennas while limiting feedback from a mobile station to a base station or vice versa. According to example embodiments, a base station determines a transmission beamforming vector without receiving information from other base stations in the communication system. Moreover, the base station determines that transmission beamforming vector based only on information received from a mobile station in the communication system.

At least one example embodiment discloses a method of reducing interference in a communication system. The method includes receiving, by a transmitter, first and second quantized matrices from a mobile station. The first and second quantized matrices are based on an estimated channel matrix and an estimated interference matrix. The method further includes determining, by the transmitter, a transmission beamforming vector based on the first and second quantized values.

Some other example embodiments provide a method of reducing interference in a communication system. The method includes first determining, by the receiver, a quantized estimated channel matrix and a quantized estimated interference matrix. The quantized estimated channel matrix and the quantized estimated interference matrix are determined by at least one of scalar quantization and vector quantization. The method also includes second determining, by the receiver, a receive beamforming vector based on the first determining.

At least another example embodiment provides a method of reducing interference in a communication system. The method includes first determining, by a transmitter, an interfering beam of an interfering transmitter and second determining, by the transmitter, a transmission beamforming vector such that a beam from the transmitter conflicts with the interfering beam at a first time.

BRIEF DESCRIPTION OF THE DRAWINGS

Example embodiments will be more clearly understood from the following detailed description taken in conjunction with the accompanying drawings. FIGS. 1-8 represent non-limiting, example embodiments as described herein.

FIG. 1 illustrates a conventional MIMO wireless link;

FIG. 4 illustrates a method of grouping a plurality of base stations to minimize interference between mobile stations according to an example embodiment;

FIG. 5A illustrates conventional beam switching at an even time/first frequency;

FIG. 5B illustrates conventional beam switching at an odd time/second frequency;

FIG. 6A illustrates beam switching at an even time/first frequency according to an example embodiment;

FIG. 6B illustrates beam switching at an odd time/second frequency according to an example embodiment;

FIG. 7 illustrates a base station including a transmitter according to an example embodiment; and FIG. 8 illustrates the mobile station MS1 including a receiver according to an example embodiment.

DETAILED DESCRIPTION

Figure 2A:
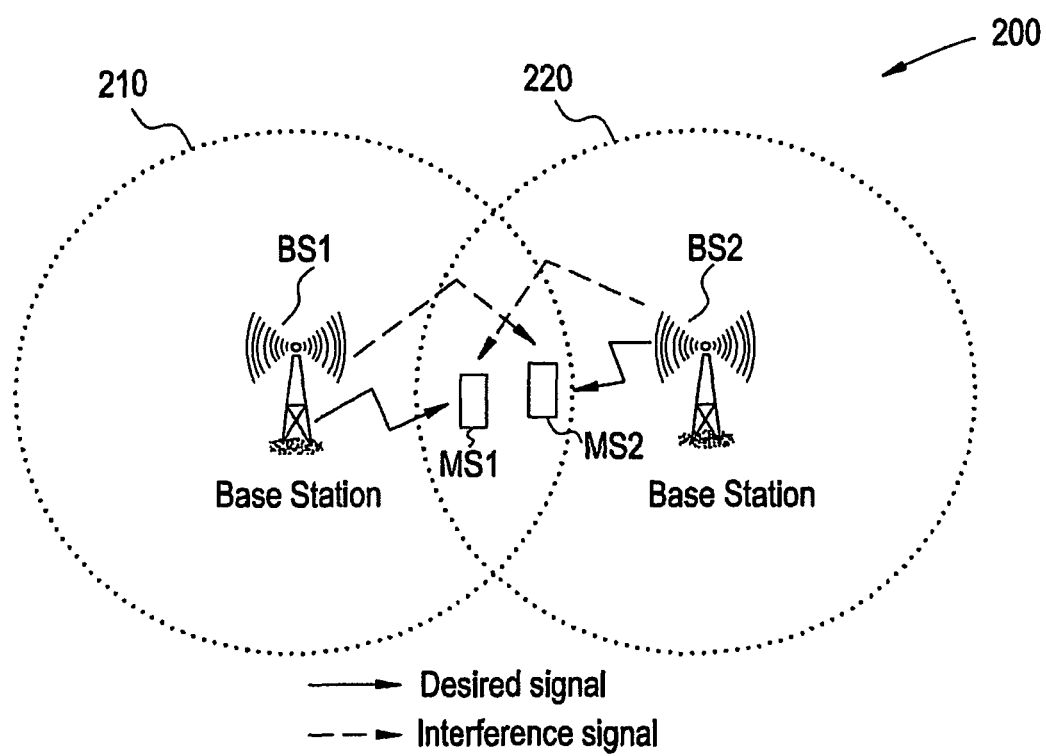
FIG. 2A illustrates a two-cell MIMO communication system according to an example embodiment.

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes (e.g., a scheduler located at a cell site, base station or Node B). Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

As used herein, the term "mobile station" (MS) may be synonymous to a mobile user, user equipment, mobile terminal, user, subscriber, wireless terminal and/or remote station and may describe a remote user of wireless resources in a wireless communication network. The term "base station" may be understood as a one or more cell sites, base stations, access points, and/or any terminus of radio frequency communication. Although current network architectures may consider a distinction between mobile/user devices and access points/cell sites, the example embodiments described hereafter may generally be applicable to architectures where that distinction is not so clear, such as ad hoc and/or mesh network architectures, for example. Serving base station may refer to the base station currently handling communication needs of the UE.

Example embodiments are directed to methods for reducing interference between users in a system having base stations and mobile stations that include multiple antennas while limiting feedback from a mobile station to a base station or vice versa. According to example embodiments, a base station determines a transmission beamforming vector without receiving information from other base stations in the communication system. Moreover, the base station determines that transmission beamforming vector based only on information received from a mobile station in the communication system.

FIG. 2A illustrates a two-cell MIMO communication system according to an example embodiment. As shown, a MIMO communication system 200 includes first and second base stations BS1 and BS2 and first and second mobile stations MS1 and MS2. The first base station BS1 serves cell 210 and the second base station serves cell 220.

FIG. 2A illustrates that the first base station BS1 is a serving base station for the first mobile station MS1 and the second base station BS2 is a serving base station for the second mobile station MS2. As shown, both first and second mobile stations MS1 and MS2 receive interfering signals (interference matrix) because of an overlapping coverage area.

Figure 2B:
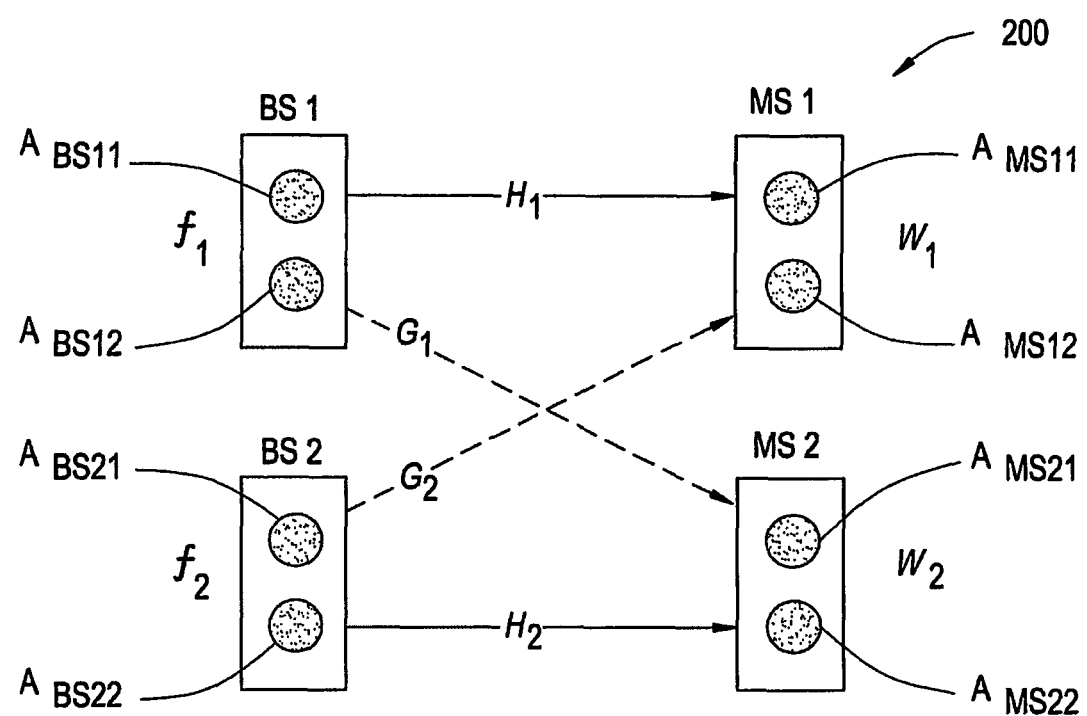
FIG. 2B illustrates a detailed view of a received channel matrix and an interference channel matrix according to an example embodiment.

FIG. 2B illustrates a more detailed view of a received channel and an interference matrix.

As shown in FIG. 2B, each of the first and second base stations BS1 and BS2 and first and second mobile stations MS1 and MS2 includes first and second antennas. The first and second base stations BS1 and BS include first and second antennas $A_{BS11}$, $A_{BS21}$ and $A_{BS12}$, $A_{BS22}$. The first and second mobile stations MS1 and MS include first and second antennas $A_{MS11}$, $A_{MS21}$ and $A_{MS12}$, $A_{MS22}$.

The first and second base stations BS1 and BS2 transmit signals according to transmission beamforming vectors $f_1$ and $f_2$, respectively. As will be described below, the transmission beamforming vectors $f_1$ and $f_2$ are determined so as to reduce interference to non-served mobile stations and increase sum throughput (effective channel gain).

The first and second mobile stations MS1 and MS2 receive signals according to receive beamforming vectors $w_1$ and $w_2$, respectively. As will be described below, the receive beamforming vectors $w_1$ and $w_2$ are determined so as to reduce interference from non-serving transmitters (from base stations and mobile stations) and increase sum throughput.

Since the first base station BS1 serves the first mobile station MS1, the first mobile station MS1 determines an estimated first received channel matrix $H_1$ based on signals and noise received over a communication link between the first base station BS1 and the first mobile station MS1. Moreover, the first mobile station MS1 determines an estimated second interference channel matrix $G_2$ based on signals and noise from the second base station BS2 that interfere with the communication link between the first base station BS1 and the first mobile station MS1.

Estimated receive channel matrix may be referred to as a channel matrix and the estimated interference channel matrix may be referred to as an interference matrix.

Since the second base station BS2 serves the second mobile station MS2, the second mobile station MS2 determines an estimated second received channel matrix $H_2$ based on signals and noise received over a communication link between the second base station BS2 and the second mobile station MS2. Moreover, the second mobile station MS2 determines an estimated first interference channel matrix $G_1$ based on signals and noise from the first base station BS1 that interfere with the communication link between the second base station BS2 and the second mobile station MS2.

The first and second mobile stations MS1 and MS2 may determine the estimated first and second received channel matrices $H_1$ and $H_2$ and the estimated first and second interference channel matrices $G_1$ and $G_2$ using known algorithms such as MMSE (minimum mean-square error estimation).

It should be understood that FIGS. 2A-2B are not limiting and the second base station BS2 may serve the first mobile station MS1 and the first base station BS1 may serve the second mobile station MS2. Moreover, while only two base stations and two mobile stations are illustrated, it should be understood that the MIMO communication system 200 may include more or less than two base stations and two mobile stations. The number of antennas in each of the base stations and mobiles stations can differ and serving base station does not need to have a same number of antennas as a receiving mobile station.

Accordingly, example embodiments will be described with respect to the MIMO communication system 200 shown in FIGS. 2A and 2B, but the example embodiments are not limited to the MIMO communication system 200 shown in FIGS. 2A and 2B.

Two-Cell MIMO Method

Figure 3A:
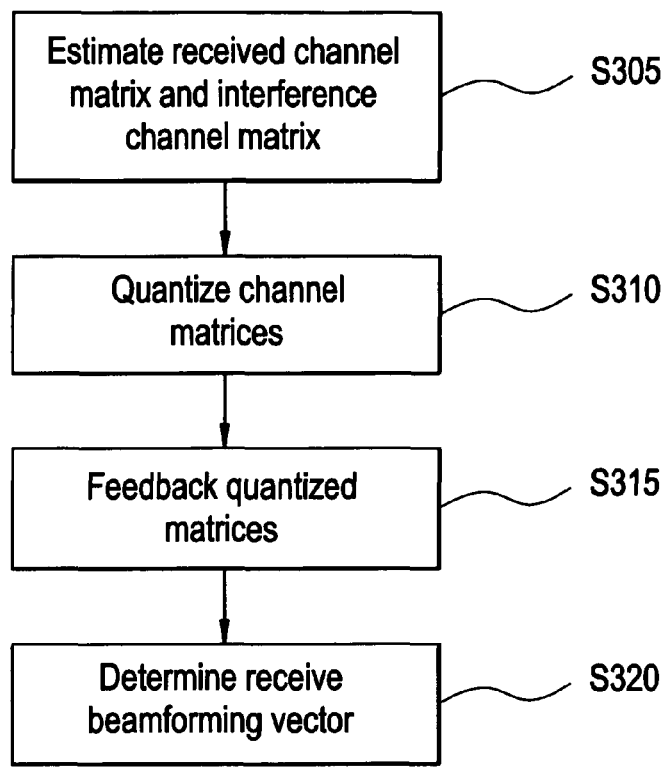
FIGS. 3A and 3B illustrate a method for reducing interference between users and increasing sum throughput from a serving base station in a downlink channel of a two-cell MIMO communication system.
Figure 3B:
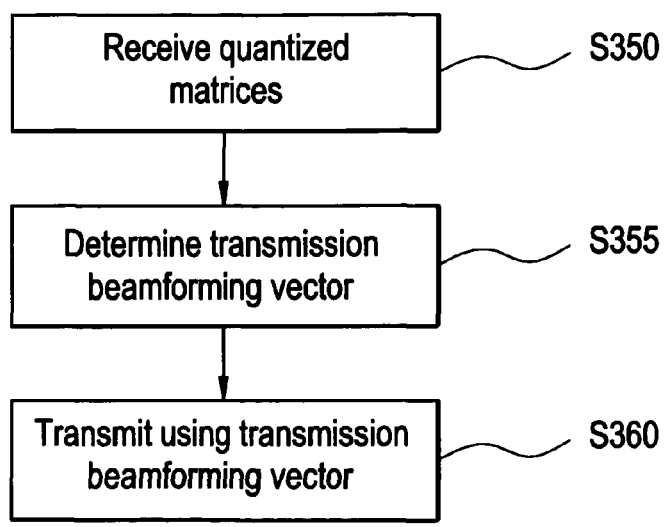

FIGS. 3A and 3B illustrate a method for reducing interference between mobile stations (users) and increasing sum throughput from a serving base station in a downlink channel of a two-cell MIMO communication system.

It should be understood that the methods of FIGS. 3A and 3B may be implemented in a two-cell or more communication system such as the MIMO communication system 200 shown in FIGS. 2A and 2B. Moreover, while FIGS. 3A and 3B are described as being implemented by the mobile station and the base station, respectively, for a downlink channel, the methods of FIGS. 3A and 3B may be used for an uplink channel. For example, the base station may implement the method of FIG. 3A and the mobile station may implement the method of FIG. 3B for the uplink.

In the description of FIGS. 3A and 3B below, k and l are used as user indexes where (1) k and l are one or two and (2) k is not the same as l. For example, in the MIMO communication system 200, the base station BS1 and the mobile station MS1 have the same user index because the base station BS1 is the serving base station for the mobile station MS1.

FIG. 3A illustrates a method implemented by a mobile station, such as the mobile station MS1 shown in FIGS. 2A and 2B. FIG. 3B illustrates a method implemented by a base station, such as the base station BS1 shown in FIGS. 2A and 2B.

As shown in FIG. 3A, a mobile station MSk determines an estimated received channel matrix $H_k$ and an estimated interference channel matrix $G_l$, at S305. The estimated received channel matrix $H_k$ is determined based on channel connection characteristics (or impulse response) between a base station BSk (e.g., a serving base station for the mobile station MSk, BS1) and the mobile station MSk (e.g., MS1). The estimated interference channel matrix $G_l$ is determined based on channel interference characteristics between the mobile station MSk and the base station BS1.

Therefore, if the mobile station MSk includes two receivers and the base station BSk includes two transmitters, then $$H_k = \begin{bmatrix} H_{11}, H_{12} \\ H_{21}, H_{22} \end{bmatrix} \quad (1)$$

and $$G_1 = \begin{bmatrix} G_{11}, G_{12} \\ G_{21}, G_{22} \end{bmatrix} \quad (2)$$

where for $H_{xy}$, x is a receiver for the mobile station MSk and y is a transmitter for the base station BSk; and for $G_{xz}$, z is a transmitter for the base station BS1.

Using FIGS. 2A and 2B as an example, the mobile station MS1 determines the estimated interference channel matrix $G_2$ based on the channel interference characteristics between the mobile station MS1 and the base station BS2.

The mobile stations MSk and MS1 may determine the estimated received channel matrices $H_k$, $H_l$ and the estimated interference channel matrices $G_k$, $G_l$ using conventional methods such as MMSE.

At step S310, the received channel matrix $H_k$ and the interference channel matrix $G_l$ are quantized by the mobile station MSk. To quantize the received channel matrix $H_k$ and the interference channel matrix $G_l$, the mobile station MSk first determines estimated channel information matrices $R_{Hk}$ and $R_{Gl}$ by $$R_{Hk} = \frac{H_k * H_k}{\|H_k\|_F^2} = \begin{bmatrix} R_{H11}, R_{H12} \\ R_{H21}, R_{H22} \end{bmatrix} \quad (3)$$

and $$R_{G1} = \frac{G_l * G_l}{\|G_l\|_F^2} = \begin{bmatrix} R_{G11}, R_{G12} \\ R_{G21}, R_{G22} \end{bmatrix} \quad (4)$$

where $H_k^*$ is a homogenization of $H_k$, $\|H_k\|_F^2$ is a normalization factor of $H_k$, $G_l^*$ is a homogenization of $G_l$, and $\|G_l\|_F^2$ is a normalization factor of $G_l$.

Both the estimated channel information matrices $R_{Hk}$ and $R_{Gl}$ are Hermitian matrices with a unit Frobenius norm, therefore $R_{Hk}$ and $R_{Gl}$ have the following properties:

$$R_{H11} + R_{H22} = 1 \quad (5)$$

$$R_{G11} + R_{G22} = 1 \quad (6)$$

$$R_{H12}^* = R_{H21} \quad (7)$$

$$R_{G12}^* = R_{G21} \quad (8)$$

Therefore, three values may be used to quantize the estimated channel information matrices $R_{Hk}$ and $R_{Gl}$. For example, $R_{H11}$, $\text{Re}\{R_{H12}\}$ and $\text{Im}\{R_{H12}\}$ may be used to quantize the estimated channel information matrix $R_{Hk}$.

Consequently, each quantized estimated channel information matrix $\hat{R}_{H\hat{k}}$ and $\hat{R}_{G\hat{l}}$ are determined by the mobile station MSk by quantization of three values. The mobile station MSk may use scalar and/or vector quantization.

To determine the quantized estimated channel information matrix $\hat{R}_{H\hat{k}}$ by scalar quantization, the mobile station may quantize three values as follows:

$Q(R_{H11}), Q(\text{Re}\{R_{H12}\})$ and $Q(\text{Im}\{R_{H12}\})$

To determine the quantized estimated channel information matrix $\hat{R}_{G\hat{l}}$ by scalar quantization, the mobile station may quantize three values as follows:

$Q(R_{G11}), Q(\text{Re}\{R_{G12}\})$ and $Q(\text{Im}\{R_{G12}\})$

To determine the quantized estimated channel information matrices $\hat{R}_{H\hat{k}}$ and $\hat{R}_{G\hat{l}}$ by vector quantization, the mobile station may quantize three values as follows:

$$v_H = \begin{bmatrix} R_{H11} \\ \text{Re}\{R_{H12}\} \\ \text{IM}\{R_{H12}\} \end{bmatrix} \quad (9)$$

and $$v_G = \begin{bmatrix} R_{G11} \\ \text{Re}\{R_{G12}\} \\ \text{IM}\{R_{G12}\} \end{bmatrix} \quad (10)$$

where $Q(v_H), Q(V_G)$.

The quantization used by the mobile station MSk may be based on uniform or non-uniform quantization. For uniform quantization, the mobile station MSk may use a same codebook for all values that are quantized. For example, T/6 bits may be used per value, where T is a total feedback overhead to the base station BSk. For non-uniform quantization, different codebooks may be used. For example, T/10 bits may be used for $Q(R_{H11})$ and $Q(R_{G11})$ and T/5 bits may be used for the remaining elements. As uniform and non-uniform quantization are known in the art, a more detailed description will be omitted for the sake of clarity.

Moreover, the mobile station may implement at least one of scalar and vector quantization based on SINR (signal-to-interference-and-noise ratio). For example, scalar quantization may be used when SINR is high. When SINR is low and the quantization level is not large (e.g., codebook size is less than 5 bits/user), vector quantization may be used.

Once the estimated channel information matrices $R_{Hk}$ and $R_{Gl}$ are quantized by the mobile station MSk, the mobile station MSk feedbacks to the base station BSk, the quantized estimated channel information matrices $\hat{R}_{H\hat{k}}$ and $\hat{R}_{G\hat{l}}$ at S315.

The base station BSk determines a transmission beamforming vector, as will described later with reference to FIG. 3B based on the feedback matrices. Since each base station may determine a transmission beamforming vector based on information from a mobile station that the base station serves, cooperation among base stations through a backbone may be eliminated.

At S320, the mobile station MSk determines a receive beamforming vector. First, the received signal at the mobile station MSk is given by $$y_k = \sqrt{\frac{P}{2}} w_k^* H_k f_k x_k + \sqrt{\frac{P}{2}} w_k^* G_l f_l x_l + w_k^* n_k \quad (11)$$

where $f_k$ is the transmission beamforming vector, $w_k$ is the receive beamforming vector, $x_k$ is the data signal for the mobile station MSk, $n_k$ is a noise vector at the mobile station MSk and P/2 is the transmit power for the base station BSk. Based on equation (11), the receive beamforming vector may be determined by $$w_k = \left(\frac{P}{2} G_l f_l f_l^* G_l^* + I_{Nr}\right)^{-1} H_k f_k \quad (12)$$

where I is the interference for the number of receiving antennas $N_r$ (e.g., 2), and $f_l$ is a transmission beamforming vector from the base station BS1 to the mobile station MS1. As shown in equation (12), the mobile station MSk may determine the receive beamforming vector based on the estimated received channel matrix $H_k$ and the estimated interference channel matrix $G_l$ that are directly determined at the mobile station MSk. Alternatively, it should be understood that the mobile station MSk may determine the receive beamforming vector based on the quantized estimated channel information matrices $\hat{R}_{H\hat{k}}$ and $\hat{R}_{G\hat{l}}$ to determine a channel matrix and an interference matrix.

The determined received beamforming vector $w_k$ increases effective channel gain and minimizes the interference from interfering transmitters.

While FIG. 3A is described with reference to the mobile station MSk, the mobile station MS1 can implement the same method and calculate quantized estimated channel information matrices $\hat{R}_{H\hat{l}}$ and $\hat{R}_{G\hat{k}}$. Therefore, for the sake of clarity and brevity a further description is not provided.

In a TDD (time-division duplex) system, S310 and S315 may be skipped. The base station BSk may estimate the downlink channel using reciprocity. Reciprocity is known and, therefore, will not be described in greater detail.

FIG. 3B illustrates a method implemented by a base station, such as the base station BSk.

At S350, the base station BSk receives the quantized estimated channel information matrices $\hat{R}_{H\hat{k}}$ and $\hat{R}_{G\hat{l}}$. Based on the quantized estimated channel information matrices $\hat{R}_{H\hat{k}}$ and $\hat{R}_{G\hat{l}}$, the base station BSk determines the transmission beamforming vector in step S355. The transmission beamforming vector may be determined as follows (if base station BSk knows perfect information):

$$f_k = v_{max}\left\{\left(G_k^* G_k + \frac{2}{P} I_{Nt}\right)^{-1} H_k^* H_k\right\} \quad (13)$$

where I is the interference for a number of transmitting antennas $N_t$ (e.g., 2). However, since the base station BSk most likely does not know perfect information, the base station may substitute the received channel matrix Hk and the interference channel matrix $G_k$ with the quantized estimated channel information matrices $\hat{R}_{H\hat{k}}$ and $\hat{R}_{G\hat{k}}$, respectively.

After the transmission beamforming vector is determined, the base station BSk uses the transmission beamforming vector to communicate with the mobile station MSk, at S360. Therefore, the base station BSk determines the transmission beamforming vector without receiving information from other base stations in the communication system. Moreover, the base station BSk determines that transmission beamforming vector based only on information received from the mobile station MSk in the communication system.

Greater than Two-Cell MIMO Method

FIG. 4 illustrates a method of grouping a plurality of base stations to minimize interference between mobile stations.

As shown in FIG. 4, base stations BS1, BS3, BS5, BS7 and BS9 are positioned in a first building and base stations BS2, BS4, BS6 and BS8 are positioned in a second building. At an even scheduling time (for TDD) or first frequency band (for FDD), base stations BS k and BS k+1 support two mobile stations using the transmission beamforming vector determined in equation (13), where k equals 1, 3, 5 and 7. At an odd scheduling time or a second frequency band, base stations BS k+1 and BS k+2 support two mobile stations using the transmission beamforming vector determined in equation (13). Each mobile station uses the receive beamforming vector determined in equation (12). Each base station BS1-B9 knows the physical beam switching pattern/frequency partitioning because the physical beam switching pattern/frequency partitioning is broadcasted to all of the base stations BS1-BS9. The beam switching pattern/frequency partitioning may be determined based on cell planning which includes at least one of (1) locations of the base stations BS1-BS9, (2) cell structures and (3) empirical data.

FIGS. 5A and 5B illustrate a conventional method of beam switching (for TDD)/frequency partitioning (for FDD) to avoid background interference from non-supporting base stations. The arrows shown in FIGS. 5A and 5B indicate the direction of the beam. FIG. 5A illustrates the beam switching/frequency partitioning at an even time/first frequency and FIG. 5B illustrates the beam switching/frequency partitioning at an odd time/second frequency. Each FIGS. 5A and 5B show a plane 500 which is used a reference to describe the directions and angles of beams of the base stations BS1, BS3 and BS5.

As shown in FIG. 5A, non-supporting base stations BS1, BS3 and BS5 transmit beams in a positive azimuth direction. More specifically, the base station BS1, the base station BS3 and the base station BS5 transmit beams in a right direction.

Additionally, each of the non-supporting base stations BS1, BS3 and BS5 transmits a beam at an opposite angle of the adjacent non-supporting base stations. As shown in FIG. 5A, the base station BS1 transmits a beam at a 45 degree angle with respect to the plane 500. The non-supporting base station adjacent to the base station BS1, the base station BS3, transmits a beam at a −45 degree angle with respect to the plane 500. Since the base station BS3 transmits the beam at a −45 degree angle, the adjacent non-supporting base station BS5 transmits a beam at a 45 degree angle with respect to the plane 500. While 45 and −45 degree angles are used to describe example embodiments, any angle and any number of beams may be used.

In FIG. 5B, each of the base stations BS1, BS3 and BS5 switch the directions of the beams, respectively, for odd timing or a second frequency. More specifically, each of the base stations BS1, BS3 and BS5 transmits a beam in a negative azimuth direction. In other words, the base station BS1, the base station BS3 and the base station BS5 transmit beams in a left direction.

Additionally, each of the non-supporting base stations BS1, BS3 and BS5 transmits a beam at an opposite angle of the adjacent non-supporting base stations. As shown in FIG. 5B, the base station BS1 transmits a beam at a 45 degree angle with respect to the plane 500. The non-supporting base station adjacent to the base station BS1, the base station BS3, transmits a beam at a −45 degree angle with respect to the plane 500. Since the base station BS3 transmits the beam at a −45 degree angle, the adjacent non-supporting base station BS5 transmits a beam at a 45 degree angle with respect to the plane 500.

Figure 6C:
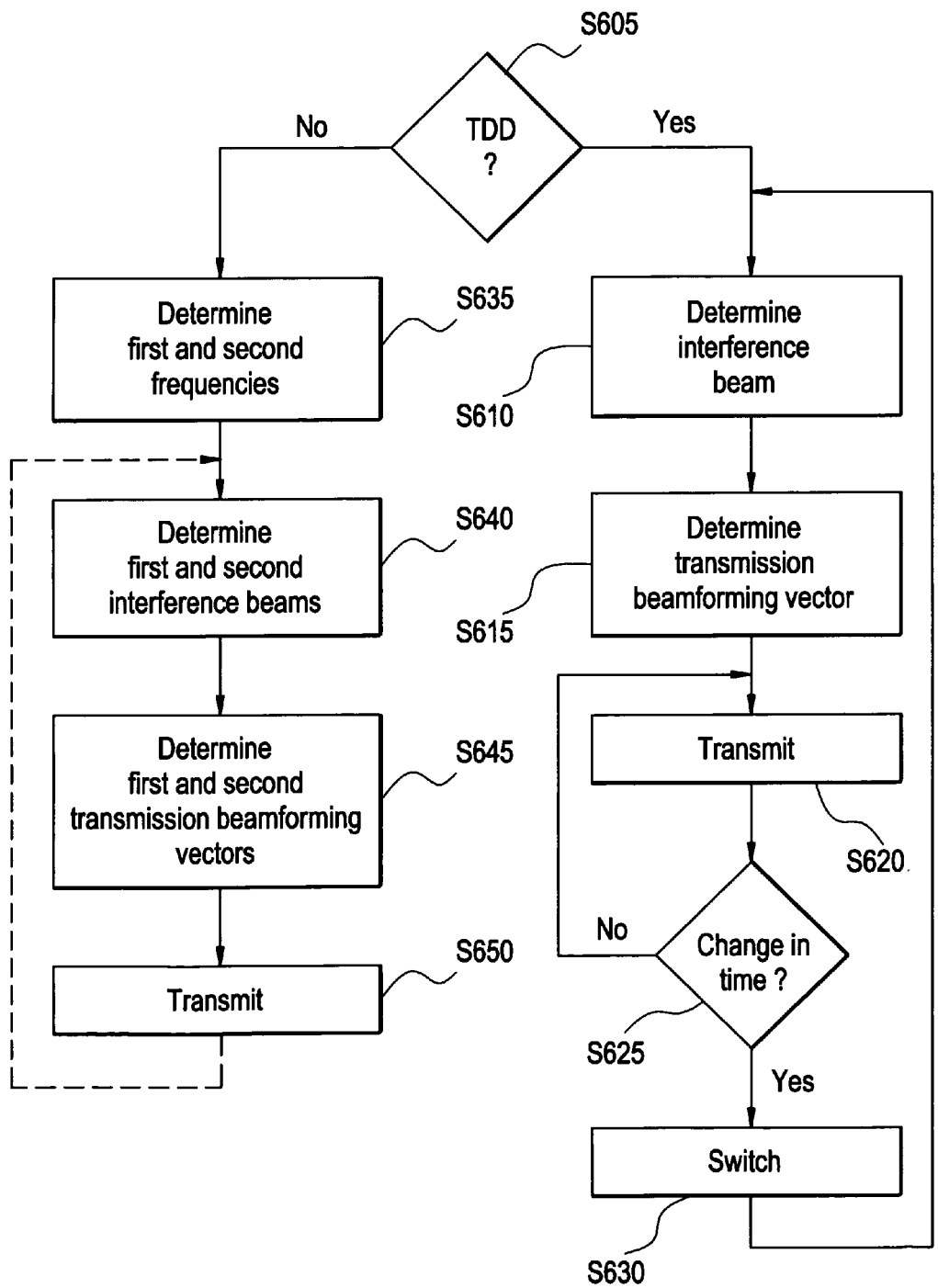
FIG. 6C illustrates a method of beam switching according to an example embodiment.

FIGS. 6A and 6B illustrate a method of beam switching/frequency partitioning to avoid background interference from non-supporting base stations according to example embodiments. The arrows shown in FIGS. 6A and 6B indicate the direction of the beam. FIG. 6A illustrates the beam switching/frequency partitioning at an even time/first frequency and FIG. 6B illustrates the beam switching/frequency partitioning at an odd time/second frequency. Each FIGS. 6A and 6B show a plane 600 which is used a reference to describe the directions and angles of beams of the base stations BS1, BS3 and BS5. FIG. 6C illustrates a flow chart of the method shown in FIGS. 6A and 6B.

As shown in FIG. 6A, non-supporting interfering base stations are allocated into groups of two. As provided above the beam switching/frequency partitioning, including the allocation, is determined based on cell-planning. For each group of two base stations, the base stations transmits beams at opposite directions and opposite angles so that the beams directly conflict, creating a large interference. More specifically, a first beam is transmitted in a negative azimuth direction and a second beam is transmitted in a positive azimuth direction. The first beam may be transmitted at a first angle and the second beam is transmitted the negative of the first angle.

For example, in FIG. 6A, the base station BS1 and the base station BS3 are in one group for the even time/first frequency. The base station BS1 transmits a beam in a positive azimuth direction and at an angle of 45 degrees with respect to the plane 600. The base station BS3 transmits a beam in a negative azimuth direction and at an angle of −45 degrees with respect to the plane 600. Therefore, the beams of the base station BS1 and the base station BS2 directly conflict.

At the even time/first frequency, a mobile station and serving base station may implement the two-cell MIMO method to determine receive and transmission beamforming vectors that reduce or eliminate the direct conflict interference.

For example, a mobile station (e.g., MS1) that is served by the base station BS1 and the base station BS1 may determine the transmission and receive beamforming vectors according to the method of FIGS. 3A and 3B to eliminate or reduce the interference from the base station BS3. The mobile station served by the base station BS1 and the base station BS1 may determine a transmission beamforming vector and a receive beamforming vector based on FIGS. 3A-3B, where the base station BS3 is the interfering base station.

Therefore, the interference from the base station BS3 is reduced, or eliminated, and there is marginal interference from the base station BS5, as shown in FIG. 6A. By reducing or eliminating the strongest interference (direct conflict), the beam switching sequence (time domain) or frequency partitioning pattern (frequency domain) minimize interference from other neighboring base stations (e.g., base station BS5). The base station BS3 and all other base stations may perform the same functions and determinations as the base station BS1. Therefore, for the sake of clarity and brevity, a detailed description of the base station BS3 is omitted.

At an odd time/second frequency, the groupings and beams are switched, as shown in FIG. 6B. For each group of two base stations, the base stations transmits beams at opposite directions and opposite angles so that the beams directly conflict, creating a large interference. More specifically, a first beam is transmitted in a negative azimuth direction and a second beam is transmitted in a positive azimuth direction. The first beam may be transmitted at a first angle and the second beam is transmitted the negative of the first angle.

For example, the base station BS3 and the base station BS5 are in one group for the odd time/second frequency. The base station BS3 transmits a beam in a positive azimuth direction and at an angle of −45 degrees with respect to the plane 600. During the odd time/second frequency, the base station BS3 transmits a beam at a same angle as the even time/first frequency, but in a different direction. The base station BS5 transmits a beam in a negative azimuth direction and at an angle of 45 degrees with respect to the plane 600. Therefore, the beams of the base station BS3 and the base station BS5 directly conflict.

At the odd time/second frequency, a mobile station and serving base station may determine transmission and receive beamforming vectors according to the two-cell MIMO method to reduce or eliminate the direct conflict interference. The base station BS3 and/or BS5 may implement the two-cell MIMO method based on FIGS. 3A and 3B to determine transmission and receive beamforming vectors that reduce or eliminate the conflicting interference term. For the sake of brevity, an example was given above with reference to the base station BS1, therefore, a more detailed description of implementing the two-cell MIMO method is omitted.

FIG. 6C illustrates a flow chart of the beam switching/frequency partitioning methods of FIGS. 6A and 6B. FIG. 6C may be implemented by serving base stations at an even time/first frequency and at an odd time/second frequency.

As shown, at S605, a serving base station determines whether TDD is used. If TDD is used, the serving base station then determines an interference beam (e.g., interference channel information) at 5610. The mobile station being served by the serving base station determines the downlink channel from the serving base station and interference terms from interfering base stations. Therefore, the mobile station feeds back the downlink channel (from the serving base station) and the strongest interference (from the interfering base station) to the serving base station.

Based on the interference beam, the serving base station determines the transmission beamforming vector at S615. The transmission beamforming vector is determined to directly conflict with the interference beam, as illustrated in FIGS. 6A and 6B and described with reference to FIGS. 6A and 6B. The transmission beamforming vector is determined by the serving base station using the method of FIGS. 3A and 3B. At S620, the serving base station transmits information using the transmission beamforming vector.

At S625, the serving base station determines whether there is a change from even to odd time or from odd to even time. If there is no change, the serving base station continues to transmit using the transmission beamforming vector. If there is a change, the serving base station switches beam directions at S630.

Once the base station switches beam directions, the base station repeats S610 to S625. More specifically, the serving base station determines a second interference beam and a second transmission beamforming vector based on the second interference beam. The serving base station then transmits information using the second transmission beamforming vector.

For example, the base station BS3 may determine a first transmission beamforming vector based on the interference experienced by a mobile station that is attributed to the base station BS1 (at an even time). The base station BS3 may determine a second transmission beamforming vector based on the interference experienced by the mobile station that is attributed to the base station BS5 (at an odd time).

If TDD is not used, then the base station implements frequency partitioning for FDD at S635. At S635, the serving base station determines first and second frequencies to at which to transmit information. At S640, the serving base station determines first and second interference beams (e.g., interference channel information) from first and second interfering base stations.

Once the first and second interference beams are determined, the serving base station determines first and second transmission beamforming vectors based on the first and second interference beams, respectively, at S645. The first and second transmission beamforming vectors are determined to directly conflict with the first and second interference beams, respectively, as illustrated in FIGS. 6A and 6B and described with reference to FIGS. 6A and 6B. The first and second transmission beamforming vectors are determined by the serving base station using the method of FIGS. 3A and 3B.

For example, the base station BS3 may determine a first transmission beamforming vector based on the interference experienced by a mobile station that is attributed to the base station BS1 (at a first frequency). The base station BS3 may determine a second transmission beamforming vector based on the interference experienced by the mobile station that is attributed to the base station BS5 (at a second frequency).

At S650, the serving base station transmits information at first and second frequencies using the first and second transmission beamforming vectors, respectively. The serving base station may return to S640 periodically, continuously or if an event occurs.

While TDD and FDD are described and illustrated, it should be understood that example embodiments are not limited to FDD and TDD.

Figure 7:
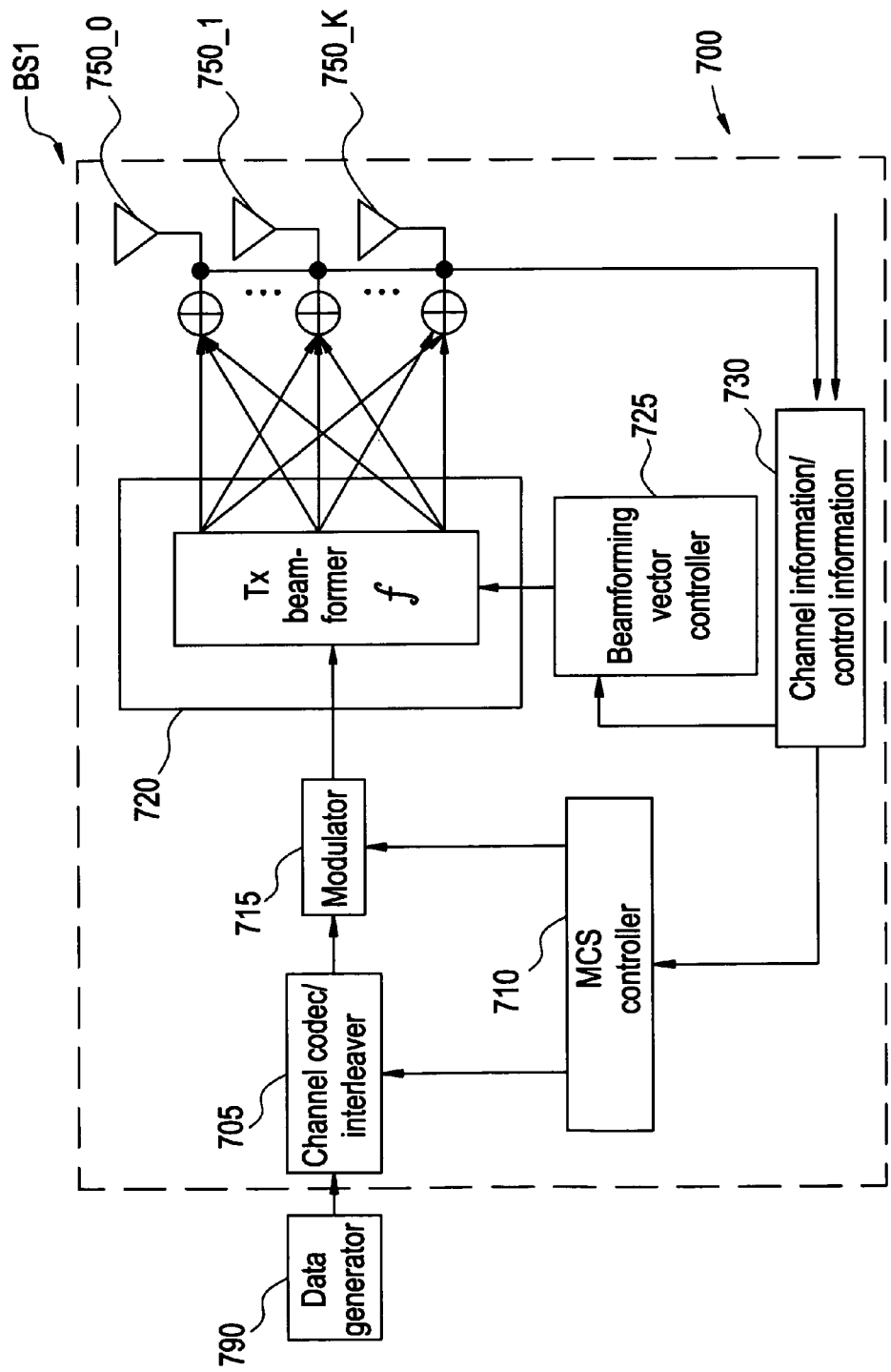

FIG. 7 illustrates the base station BS1 including a transmitter according to an example embodiment. While a transmitter 700 is illustrated as being implemented in the base station BS1, it should be understood that the transmitter 700 may be included in all base stations and mobile stations.

As shown, the base station BS1 includes the transmitter 700 configured to receive data from a data generator 790. It should be understood that the base station BS1 shown in FIG. 7 is merely for illustrative purposes and that the base station BS1 may include additional features not shown in FIG. 7.

The data generator 790 is connected to a channel codec/interleaver 705 of the transmitter 700. The transmitter 700 further includes an MCS (modulation and coding scheme) controller 710, a modulator 715, a transmission beamformer 720, a beamforming vector controller 725, a channel information/control information processor 730 and a plurality of transmission antennas 750_0-750_K.

The MCS controller 710 is configured to output MCS data to the channel codec/interleaver 705 and the modulator 715 based on an output received from the channel information/control information processor 730. The channel information/control information processor 730 receives feedback data from the plurality of transmission antennas 750_0-750_K as well as channel information/control information from other base stations and mobile stations.

The channel codec/interleaver 705, MCS controller 710, modulator 715, channel information/control information processor 730 and plurality of transmission antennas 750_0-750_K are known, and therefore, a further description of these features is omitted.

The beamforming vector controller 725 is configured to receive channel information/control information from the channel information/control information processor 730. For example, the beamforming vector controller 725 may receive quantized estimated channel information matrices $\hat{R}_{\hat{H}k}$ and $\hat{R}_{\hat{G}k}$ from a mobile station being served by the base station BS1 via the channel information/control information processor 730. Based on the quantized estimated channel information matrices $\hat{R}_{\hat{H}k}$ and $\hat{R}_{\hat{G}k}$, the beamforming vector controller 725 is configured to implement the method of FIGS. 3A and 3B and determine a transmission beamforming vector.

The beamforming vector controller 725 inputs the transmission beamforming vector to the transmission beamformer 720. The transmission beamformer 720 is configured to transmit signals using the transmission beamforming vector.

FIG. 8 illustrates the mobile station MS1 including a receiver according to an example embodiment. While a receiver 800 is illustrated as being implemented in the mobile station MS1, it should be understood that the receiver 800 may be included in all base stations and mobile stations.

As shown, the mobile station MS1 includes the receiver 800 configured to input data to a controller 890. It should be understood that the mobile station MS1 shown in FIG. 8 is merely for illustrative purposes and that the mobile station MS1 may include additional features not shown in FIG. 8.

The receiver 800 includes a beamforming vector controller 805, a receive beamformer 810, a demodulator 815, a deinterleaver/channel decodec 820, a channel estimator/quantizer 825 and a plurality of receiving antennas 830_0-830_N.

The receive beamformer 810 receives outputs from the beamforming vector controller 805 and the channel estimator/quantizer 825. The receive beamformer 810 outputs data to the demodulator 815. The demodulator receives the data from the receive beamformer 810 and outputs demodulated data to the deinterleaver/channel decodec 820. Based on the demodulated data, the deinterleaver/channel decodec 820 outputs data to the controller 890.

The demodulator 815 and deinterleaver/channel decodec 820 are known in the art, and therefore, a further description of these features is omitted.

The channel estimator/quantizer 825 is configured to receive signals from the plurality of receiving antennas 830_0-830_N. The channel estimator 825 determines quantized estimated channel information matrices $\hat{R}_{\hat{H}k}$ and $\hat{R}_{\hat{G}k}$ based on the signals received from the plurality of receiving antennas 830_0-830_N. The channel estimator/quantizer 825 feedbacks to a serving base station the quantized estimated channel information matrices $\hat{R}_{\hat{H}k}$ and $\hat{R}_{\hat{G}k}$.

The beamforming vector controller 805 determines the receive beamforming vector based on the quantized estimated channel information matrices $\hat{R}_{\hat{H}k}$ and $\hat{R}_{\hat{G}k}$.

As described, example embodiments disclose apparatuses and methods for reducing interference between mobile stations (users) in a system having base stations and mobile stations that include multiple antennas while limiting feedback from a mobile station to a base station or vice versa.

Example embodiments being thus described, it will be obvious that the same may be varied in many ways. For example, each base station and mobile station may have any number of antennas. Such variations are not to be regarded as a departure from the spirit and scope of example embodiments, and all such modifications as would be obvious to one skilled in the art are intended to be included within the scope of the claims.

What is claimed is:

1. A method of reducing interference in a communication system, the method comprising:
   first determining, by a transmitter, a first interfering beam of a first interfering transmitter;
   second determining, by the transmitter, a first transmission beamforming vector such that a beam from the transmitter directly opposes the first interfering beam at a first time and is transmitted at an opposite angle than the first interfering beam at the first time;
   reducing the interference by reducing an effect of the first interfering beam that directly opposes the beam from the transmitter;
   third determining, by the transmitter, a second interfering beam of a second interfering transmitter;
   fourth determining, by the transmitter, a second transmission beamforming vector such that a second beam from the transmitter conflicts with the second interfering beam; and
   transmitting, by the transmitter, using the first and second transmission beamforming vectors.

2. A transmitter comprising:
   a processor configured to determine a first interfering beam of a first interfering transmitter;
   a beamforming vector controller configured to determine a first transmission beamforming vector such that a beam from the transmitter directly opposes the first interfering beam at a first time and is transmitted at an opposite angle than the first interfering beam at the first time to reduce the interference by reducing an effect of the first interfering beam that directly opposes the beam from the transmitter; and
   a transmission beamformer, wherein
      the processor is configured to determine a second interfering beam of a second interfering transmitter,
      the beamforming vector controller is configured to determine a second transmission beamforming vector such that a second beam from the transmitter conflicts with the second interfering beam, and
      the transmission beamformer is configured to transmit using the first and second transmission beamforming vectors.

* * * * *